United States Patent Office 3,361,559
Patented Jan. 2, 1968

3,361,559
METHOD FOR ANTIMONY PRECIPITATION OF MERCURY
Joseph W. Town, Albany, Oreg., assignor to the United States of America as represented by the Secretary of the Interior
No Drawing. Filed Feb. 16, 1965, Ser. No. 433,230
3 Claims. (Cl. 75—109)

ABSTRACT OF THE DISCLOSURE

Precipitating elemental mercury from an aqueous sodium sulfide-sodium hydroxide solution containing mercury and antimony by the addition of elemental antimony to the solution.

---

The invention herein described and claimed may be manufactured and used by or for the Government of the United States of America for governmental purposes without the payment of royalties thereon or therefor.

This invention relates to selective precipitation of mercury from a solution containing mercury and antimony.

Sulfide ores or concentrates containing both mercury sulfide (HgS) and antimony sulfide ($Sb_2S_3$) are conventionally leached with sodium sulfide solution or with a sodium sulfide-sodium hydroxide solution to extract both the mercury and antimony. Such solutions contain mercury and antimony in concentrations of from about 5 grams per liter to saturation, depending on the sodium sulfide concentration of the leach solution. Typically, the sodium sulfide concentration in the leach solution ranges from about 25 to 200 grams per liter, with sodium hydroxide used to replace up to about 50 percent of the sodium sulfide. A solution concentration of 150 grams per liter sodium sulfide and 50 grams per liter sodium hydroxide is generally optimum for extracting the mercury sulfide and antimony sulfide from ore or concentrate.

Aluminum is then conventionally added to the mercury and antimony-containing extracts to precipitate the two metals. The resulting precipitate, containing mercury, antimony, sodium aluminate and aluminum, requires considerable washing before the mercury will coalesce. Some mercury is thus lost along with the antimony and unreacted aluminum.

It has now been found that this disadvantage may be overcome by treating the mercury and antimony-containing solution with antimony metal to precipitate the mercury in a clean metallic form, without precipitation of antimony. The reaction is illustrated by the following equation:

$$3Na_2HgS_2 + 2Sb \rightarrow 3Hg + 2Na_3SbS_3$$

The mercury coalesces readily for recovery and is tapped from the bottom of the reaction vessel.

When antimony is used as the precipitant no additional elements (such as aluminum) are added to the solution and the antimony can be electro-deposited from solution for reuse, thus reducing reagent consumption. The amount of antimony required to precipitate the mercury depends on the concentration of mercury in solution, temperature of solution, time allowed for reaction, particle size of antimony precipitant and concentration of antimony in solution and is best determined experimentally. An excess of antimony is usually required to obtain high mercury precipitation and the unused antimony is recovered for reuse.

It is therefore an object of the present invention to separate elemental mercury from solutions containing mercury and antimony. Another object is to separate mercury from antimony by precipitating only the mercury from a mercury-antimony solution. A further object is to provide a mercury-depleted solution from which antimony can be recovered.

The invention will be more specifically illustrated by the following example.

EFFECTS OF MERCURY AND ANTIMONY SOLUTION CONCENTRATION AND ANTIMONY ON MERCURY PRECIPITATION

[METALLURGICAL DATA]

| Solution | Antimony added | | Depleted solution Concentration, g./l. | | Equivalents of antimony consumed | Mercury recovered, percent |
|---|---|---|---|---|---|---|
| | Equivalents [1] | Grams | Mercury | Antimony | | |
| A | 1 | 3.2 | 35.80 | 28.00 | 1.67 | 52.89 |
| A | 2 | 6.4 | 26.00 | 28.50 | 1.37 | 65.79 |
| A | 3 | 9.6 | 7.59 | 35.50 | 1.25 | 90.00 |
| A | 4 | 12.8 | 0.37 | 43.60 | 1.40 | 99.47 |
| B | 1 | 2.6 | 30.90 | 25.90 | 1.26 | 50.24 |
| B | 2 | 5.2 | 10.30 | 35.00 | 1.19 | 83.41 |
| B | 3 | 7.8 | 1.55 | 38.50 | 1.16 | 97.42 |
| B | 4 | 10.4 | 0.37 | 46.50 | 1.46 | 99.36 |
| C | 1 | 2.0 | 23.10 | 32.90 | 1.32 | 51.27 |
| C | 2 | 4.1 | 9.55 | 39.00 | 1.24 | 79.75 |
| C | 3 | 6.1 | 2.56 | 44.50 | 1.35 | 94.51 |
| C | 4 | 8.1 | 0.40 | 52.00 | 1.68 | 99.16 |
| D | 1 | 1.4 | 15.00 | 39.30 | 1.41 | 53.85 |
| D | 2 | 2.8 | 3.69 | 45.00 | 1.34 | 88.62 |
| D | 3 | 4.3 | 1.04 | 47.90 | 1.45 | 96.92 |
| D | 4 | 5.7 | 0.83 | 43.00 | 1.07 | 97.54 |

[1] Antimony equivalents based on the valence of Sb as plus 3 and Hg as plus 2.

Operating Conditions

Concentrates leached:
 (A) 79.0 percent mercury, 0.49 percent antimony.
 (B) 65.0 percent mercury, 9.74 percent antimony.
 (C) 50.0 percent mercury, 19.4 percent antimony.
 (D) 35.0 percent mercury, 29.1 percent antimony.
Leach solution, 150 g./l. $Na_2S$, 50 g./l. NaOH.
Head Solutions:
 (A) 76.00 g./l. mercury, 0.81 g./l. antimony.
 (B) 62.10 g./l. mercury, 10.00 g./l. antimony.
 (C) 47.40 g./l. mercury, 20.00 g./l. antimony.
 (D) 32.50 g./l. mercury, 29.30 g./l. antimony.
Solution volume, 100 ml.
Precipitation time, 2 hours.
Temperature, 60° C.
Antimony particle size, powder.

Example

A series of experiments to determine the effect of different solution concentrations of mercury and antimony, and equivalents of antimony on the precipitation of mercury are shown in the following table. The results show that with four equivalents of antimony to mercury, from 97.5 to 99.5 percent of the mercury can be recovered from solution. Lower concentrations of mercury and higher concentrations of antimony in solution have a slightly negative effect on the percent mercury precipitated. Final mercury solution concentrations for the four solutions are about the same with four equivalents of antimony. Increased temperature improved results slightly and precipitation time was insignificant when powdered antimony was used. Coarse (large particle size) antimony may also be used as precipitant; however, this usually results in considerable retardation of the reaction rate as compared to the powdered metal. The results thus show the simplicity and workability of the process in recovering mercury metal from solutions containing both mercury and antimony.

What is claimed is:

1. A method for recovery of mercury from an aqueous solution containing mercury sulfide, antimony sulfide, and sodium salt selected from the group consisting of sodium sulfide and a mixture of sodium sulfide and sodium hydroxide comprising adding elemental antimony to the solution to precipitate elemental mercury.

2. The method of claim 1 wherein said aqueous solution contains at least 5 grams of mercury per liter, and from about 25 to 200 grams sodium salt per liter.

3. The method of claim 1 in which the mercury and antimony-containing aqueous solution is derived from leaching sulfide ores with a reagent from the group consisting of sodium sulfide and a sodium sulfide-sodium hydroxide mixture.

References Cited

UNITED STATES PATENTS

| | | | |
|---|---|---|---|
| 1,119,377 | 12/1914 | Thornhill | 75—109 |
| 3,039,865 | 6/1962 | Gilbert et al. | 75—81 |

DAVID L. RECK, *Primary Examiner.*

N. F. MARKVA, P. WEINSTEIN, *Assistant Examiners.*